(12) United States Patent
Tachikawa (10) Patent No.: US 6,722,810 B1
(45) Date of Patent: Apr. 20, 2004

(54) COUPLING STRUCTURE OF EXTENSIBLE SHAFTS

(75) Inventor: Seiichi Tachikawa, Gunma-ken (JP)

(73) Assignee: NSK Ltd., Tokyo (JP)

( * ) Notice: Subject to any disclaimer, the term of this patent is extended or adjusted under 35 U.S.C. 154(b) by 3 days.

(21) Appl. No.: 09/868,777

(22) PCT Filed: Oct. 27, 2000

(86) PCT No.: PCT/JP00/07596

§ 371 (c)(1),
(2), (4) Date: Jun. 21, 2001

(87) PCT Pub. No.: WO01/31217

PCT Pub. Date: May 3, 2001

(30) Foreign Application Priority Data

| Oct. 28, 1999 | (JP) | 11-306573 |
| Apr. 3, 2000 | (JP) | 2000-101088 |
| Sep. 19, 2000 | (JP) | 2000-283765 |

(51) Int. Cl.$^7$ .............. F16D 1/00; B25G 3/28; F16B 7/10
(52) U.S. Cl. .......... 403/362; 403/109.1; 403/359.1; 403/377
(58) Field of Search .......... 403/379.3, 377, 403/362, 109.1, 109.2, 109.4, 359.1

(56) References Cited

U.S. PATENT DOCUMENTS

| 670,040 A | * | 3/1901 | Thompson | 403/373 |
| 2,290,430 A | * | 4/1942 | Heiser | 287/126 |
| 2,997,317 A | * | 4/1961 | Scott | 285/397 |
| 3,484,830 A | * | 12/1969 | Wagner et al. | 285/397 |
| 3,507,508 A | * | 4/1970 | Andrews | 279/83 |
| 3,547,475 A | * | 12/1970 | Gingher | 287/103 |
| 3,572,778 A | * | 3/1971 | Cassel | 285/382 |
| 3,606,408 A | * | 9/1971 | Wagner | 287/54 |
| 3,905,623 A | * | 9/1975 | Cassel | 285/382 |
| 4,249,830 A | * | 2/1981 | Day | 403/7 |
| 4,440,518 A | * | 4/1984 | Davlantes | 403/297 |
| 4,657,426 A | * | 4/1987 | Targetti | 403/297 |
| 4,818,135 A | | 4/1989 | Desjardins | 403/104 |
| 4,859,109 A | * | 8/1989 | Targetti | 403/297 |
| 4,896,892 A | * | 1/1990 | Andrews | 279/1 |
| 4,915,538 A | * | 4/1990 | Golden et al. | 403/362 |
| 5,664,806 A | | 9/1997 | Vortmeyer et al. | 280/777 |
| 5,893,675 A | * | 4/1999 | Lange | 403/297 |
| 6,053,656 A | * | 4/2000 | Heilig | 403/362 |
| 6,176,640 B1 | * | 1/2001 | Gonczi | 403/375 |

FOREIGN PATENT DOCUMENTS

| DE | 2036050 | 1/1972 |
| DE | 8800848 U | 6/1989 |

* cited by examiner

Primary Examiner—Anthony Knight
Assistant Examiner—Michael J. Kyle
(74) Attorney, Agent, or Firm—Miles & Stockbridge P.C.

(57) ABSTRACT

An outer shaft is spline-fitted to an inner shaft and, after thus assembling the shafts, an adjustment screw is moved inwards in the radial direction while being fastened. An interval in the radial direction between a screw member and a receiving member of a diameter-expanding member is thereby expanded, thereby thrusting the inner shaft outward in the radial direction against the outer shaft. A thrusting force acting in the radial direction on the inner shaft against the outer shaft can be adjusted by controlling a fastening force of the adjustment screw. It is therefore possible to easily adjust a slide resistance between the two shafts and surely prevent a "backlash" between the two shafts.

27 Claims, 9 Drawing Sheets

COUPLING STRUCTURE OF EXTENSIBLE SHAFTS

TECHNICAL FIELD

The present invention relates generally to a coupling structure of extensible shafts used for a steering apparatus, etc., of an automobile, and more particularly to a coupling structure of extensible shafts, which is capable of easily adjusting a sliding resistance between an inner shaft and an outer shaft even after the outer shaft has been assembled to the inner shaft by spline-fitting.

BACKGROUND ARTS

One type of a steering apparatus of an automobile is a telescopic type steering apparatus capable of adjusting an axial length of a steering shaft corresponding to a sitting posture and a physique of the driver.

In this telescopic type steering shaft, an outer shaft connected via a universal joint, etc., to a steering wheel is spline-fitted to an inner shaft connected via a universal joint, etc., to a gear, etc., on the side of the wheels. With this configuration, a length of the steering shaft can be adjusted in such a way that the outer shaft slides on the inner shaft in the axial direction.

The telescopic type steering shaft has drawbacks wherein there is a scatter in slide resistance between the inner and outer shafts depending on the shafts as products when the outer shaft is spline-fitted to the inner shaft and thus assembling these shafts, and a "backlash" occurs between the inner and outer shafts. Therefore, generally the slide resistance between the two shafts is adjusted by controlling a thrusting force acting in the radial direction on the inner shaft against the outer shaft, and the "backlash" between the two shafts is thus prevented.

According to, e.g., Japanese Patent Application Laid-Open Publication No. 11-198822, an adjustment screw and a wedge-shaped diameter-expanding member are provided within the inner shaft. When this adjustment screw is intruded in the axial direction, the wedge-shaped diameter-expanding member expands its diameter in the radial direction, and the thrusting force acting in the radial direction on the inner shaft against the outer shaft is thus adjusted. The slide resistance between the inner and outer shafts can be thereby adjusted, and the "backlash" between these two shafts can also be prevented.

Further, according to Japanese Patent Application Laid-Open Publication No. 2-87116, similarly when the adjustment screw is intruded in the axial direction within the inner shaft, a diameter of a tapered portion of a collar (diameter-expanding member) is expanded in the radial direction, thereby adjusting the thrusting force acting in the radial direction on the inner shaft against the outer shaft. With this adjustment, the slide resistance between the two shafts can be adjusted, and the "backlash" between these two shafts can also be prevented.

In the telescopic type steering shaft disclosed in both of the Publications, however, the thrusting force is controlled by moving the adjustment screw in the axial direction which is provided within the inner shaft, and the slide resistance is thus adjusted. Hence, the outer shaft is spline-fitted to the inner shaft and, after thus assembling these shafts, an operation of moving the adjustment screw in the axial direction within the inner shaft is comparatively hard, resulting in a poor operation efficiency. Further, even when adjusting the thrusting force before the assembly, it is comparatively difficult to modify the adjusted thrusting force after the assembly.

DISCLOSURE OF INVENTION

It is an object of the present invention, which was devised under such circumstances, to provide a coupling structure of extensible shafts that is capable of easily adjusting a slide resistance between an inner shaft and an outer shaft even after assembling the inner and outer shafts by getting the outer shaft spline-fitted to the inner shaft, and of surely preventing a "backlash" between the two shafts.

To accomplish the above object, according to one aspect of the present invention, a coupling structure of extensible shafts extensible in an axial direction and coupled so as to be incapable of rotating, is characterized by comprising an inner shaft, an outer shaft fitted to the inner shaft so as to be incapable of rotating and slidable in the axial direction, and an adjustment screw movable in radial direction of the two shafts, wherein the adjustment screw is moved in the radial direction after the outer shaft has been fitted to the inner shaft, and a thrusting force in the radial direction between the two shafts is thus adjusted.

A coupling structure of extensible shafts according a second aspect of the present invention is characterized in that the outer shaft is hollowed and has a through-hole formed in the radial direction, the inner shaft is hollowed and has a female thread formed in the radial direction facing to the through-hole, and the adjustment screw penetrates the through-hole, meshes with the female thread, moves in the radial direction of the inner shaft, then thrusts an inner peripheral portion of the inner shaft, and thus adjusts a thrusting force between the two shafts.

A coupling structure of extensible shafts according to a third aspect of the invention is characterized in that the outer shaft is hollowed and has a through-hole formed in the radial direction, the inner shaft is hollowed and has a through-hole formed in the radial direction facing to the through-hole, a screw member formed with a female thread in the radial direction that meshes with the adjustment screw is provided inwardly of the inner shaft, and the adjustment screw penetrates the through-hole, meshes with the female thread of the screw member, moves in the radial direction of the inner shaft, then thrusts an inner peripheral portion of the inner shaft, and thus adjusts a thrusting force between the two shafts.

A coupling structure of extensible shafts according to a fourth aspect of the invention is characterized by further comprising a receiving member for supporting a front side end of the adjustment screw.

A coupling structure of extensible shafts according to a fifth aspect of the invention is characterized in that the screw member and the receiving member are integrally formed through a connecting portion that is elastically deformable in the radial direction of the inner shaft.

A coupling structure of extensible shafts according to a sixth aspect of the invention is characterized in that the receiving member includes two side walls facing to each other in the axial direction of the inner shaft and extending in a direction substantially right-angled to the axial direction, and a bottom portion having a swelling, formed at its center in the axial direction to integrally connect the side walls, upon which a front side end of the adjustment screw impinges, the two side walls holding the screw member, the swelling is thrust as the adjustment screw moves in the radial direction, the two side walls move in the radial direction of the inner shaft while slidably holding both of side surfaces of the screw member in the axial direction, the screw member and the receiving member thrust the inner peripheral portion of the inner shaft, and a thrusting force between the two shafts is thus adjusted.

A coupling structure of extensible shafts according to a seventh aspect of the invention is characterized in that the screw member has a brace extending towards both sides in the axial direction from the central portion formed with the female thread, then bent outwards in the radial direction and impinging on an inner peripheral surface of the inner shaft, the receiving member has a brace extending towards both sides in the axial direction from the central portion for supporting the front side end of the adjustment screw, then bent in the radial direction on the opposite side to the brace of the screw member, and impinging on an inner peripheral surface of the inner shaft, and both of the braces are given a spring property.

A coupling structure of extensible shafts according to an eighth aspect of the invention is characterized in that a pair of the screw member and the receiving member are provided at a predetermined interval in the axial direction of the inner shaft, and the screw member and the receiving member are integrally formed at the predetermined interval through an elastically deformable connecting portion.

A coupling structure of extensible shafts according to a ninth aspect of the invention is characterized in that the inner shaft has at least a couple of elongate holes formed in the vicinity of a portion provided with the adjustment screw and extending in the direction parallel to the axial direction of the inner shaft, and the elongate holes function to lessen a rigidity of the inner shaft.

A coupling structure of extensible shafts according to a tenth aspect of the invention is characterized in that the outer shaft is hollowed, and the inner shaft is fitted in the outer shaft, a ring-like member having a screw portion formed with a female thread in the radial direction that meshes with the adjustment screw and a receiving portion, provided in a position facing in the radial direction to the screw portion, for supporting the outer shaft, is provided along a periphery of the outer shaft at a portion where the inner and outer shafts are fitted to each other, and the adjustment screw meshes with the female thread of the screw portion of the ring-like member and thus moves inwards in the radial direction of the outer shaft, a front side end of the adjustment screw and the receiving portion thereby thrust the outer shaft in an inside-diametrical direction, and a thrusting force acting inside in the radial direction of the outer shaft is thus adjusted.

EMBODIMENTS OF THE INVENTION

Embodiments of a coupling structure of extensible shafts according to the present invention will hereinafter be described with reference to the drawings.

First Embodiment

Figure 1:
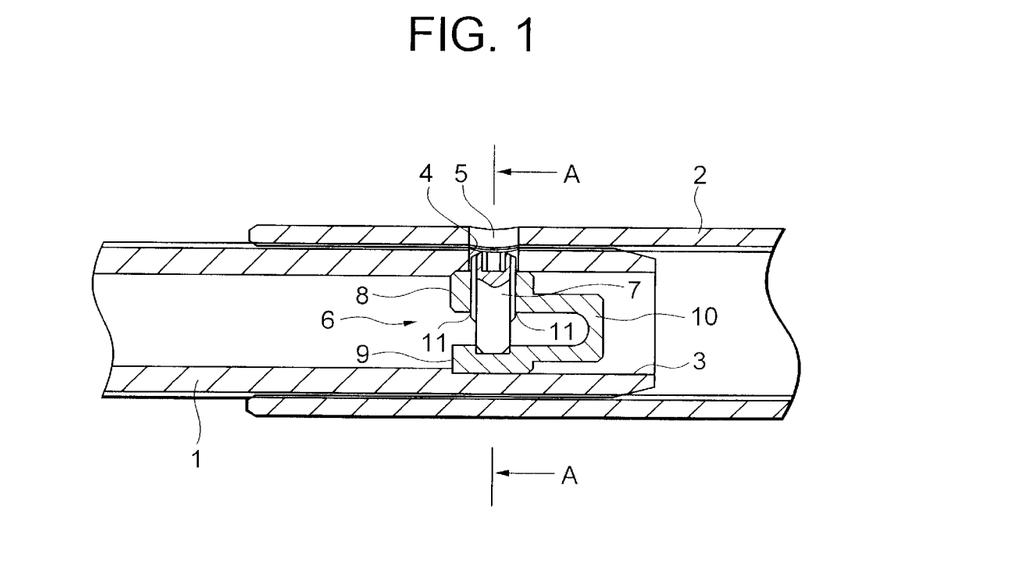
FIG. 1 is a vertical sectional view showing a steering shaft for a vehicle, to which a coupling structure of extensible shafts in a first embodiment of the present invention is applied.
Figure 2:
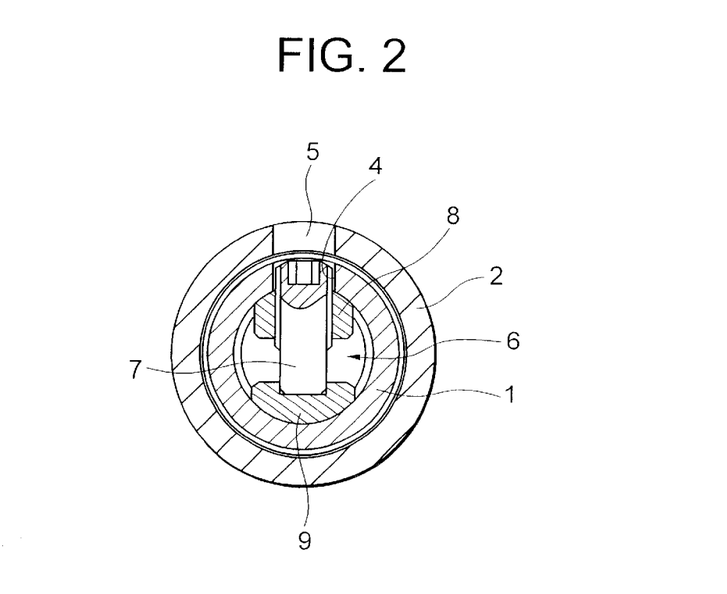
FIG. 2 is a cross-sectional view taken along the line A—A in FIG. 1.

FIG. 1 is a vertical sectional view showing a steering shaft for a vehicle, to which the coupling structure of the extensible shafts in a first embodiment of the present invention is applied. FIG. 2 is a cross-sectional view taken along the line A—A in FIG. 1.

As shown in FIGS. 1 and 2, an outer shaft 2 is spline- or serration-fitted to an inner shaft 1. A cylindrical seat portion 3 for an insertion of a diameter-expanding member 6 which will be explained later on, is formed on an inner peripheral surface of an end portion of the inner shaft 1, and a through-hole 4 through which an adjustment screw 7 that will be described later on is inserted, is formed in a radial direction in a part of the seat portion 3. A through-hole 5 through which to insert the adjustment screw 7 that will hereinafter be explained, is formed facing to the through-hole 4 in the radial direction in an end portion of the outer shaft 2.

The diameter-expanding member 6 for thrusting the inner shaft 1 outwards in the radial direction is inserted in the seat portion 3 of the inner shaft 1. The adjustment screw 7 for expanding a diameter of the diameter-expanding member 6 is screwed to this diameter-expanding member 6 in the radial direction.

To be specific, the diameter-expanding member 6 is provided with a screw member 8 (first abutment member) formed with a female thread in the radial direction for being screwed to the adjustment screw 7. The diameter-expanding member 6 is provided further with a receiving member 9 (second abutment member) for supporting a front side end of the adjustment screw 7 in a way that faces to the screw member 8 (first abutment member). The screw member 8 (first abutment member) and the receiving member 9 (second abutment member) each have a protruded circumferential portion formed on the side of an outside diameter and being in contact with the cylindrical seat portion 3 formed inside the inner shaft 1. Further, the diameter-expanding member 6 is provided with a connecting portion 10 (resilient connecting member) for integrally connecting the screw member 8 to the receiving member 9 so as to be elastically deformable in the radial direction.

With this configuration, the outer shaft 2 is spline-fitted to the inner shaft 1, and, after thus assembling these shafts, the adjustment screw 7 is fastened and thus moved inward in the radial direction through the through-holes 4, 5 aligned in the radial direction. Then, a radial interval between the receiving member 9 and the screw member 8 of the diameter-expanding member 6 is expanded, thereby thrusting the inner shaft 1 against the outer shaft 2 outwards in the radial direction.

The thrusting force acting in the radial direction on the inner shaft 1 against the outer shaft 2 can be adjusted by controlling the fastening force of the adjustment screw 7. With this adjustment, the slide resistance between the two shafts 1 and 2 can easily be adjusted, and a "backlash" between the two shafts 1 and 2 can be surely prevented.

Further, as described above, even after assembling the two shafts 1, 2, the slide resistance can easily be adjusted, and hence, as compared with the prior arts, an operation efficiency can be enhanced.

Note that the screw member 8 of the diameter-expanding member 6 is previously formed with caulking 11 for preventing a slack of the adjustment screw 7.

Second Embodiment

Figure 3:
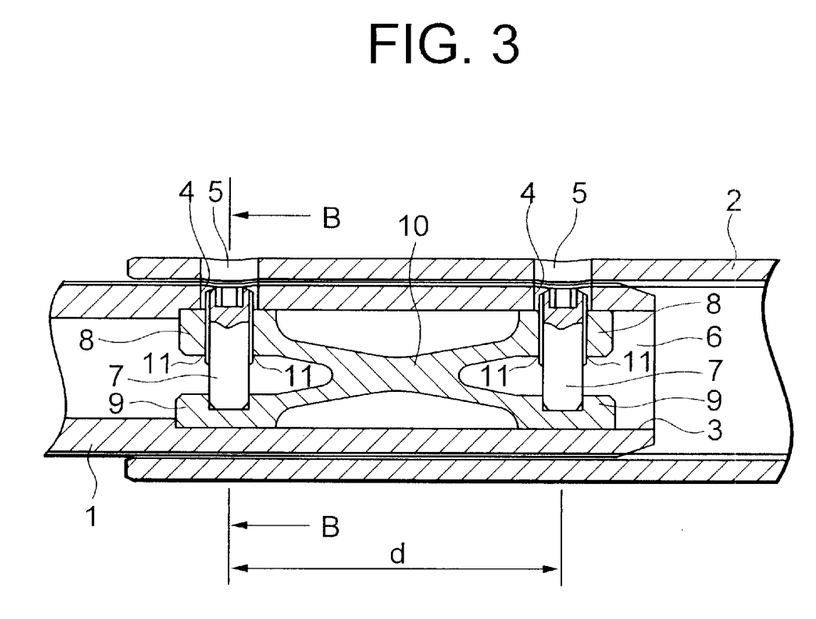
FIG. 3 is a vertical sectional view showing a steering shaft for a vehicle, to which a coupling structure of extensible shafts in a second embodiment of the present invention is applied.
Figure 4:
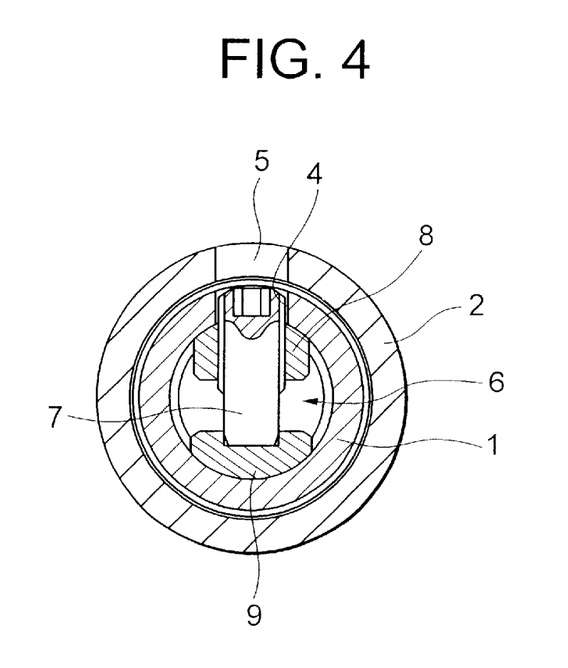
FIG. 4 is a cross-sectional view taken along the line B—B in FIG. 3.

FIG. 3 is a vertical sectional view showing a steering shaft for the vehicle, to which a coupling structure of an extensible shaft in a second embodiment of the present invention is applied. FIG. 4 is a side view showing a diameter-expanding member illustrated in FIG. 3.

Figure 5:
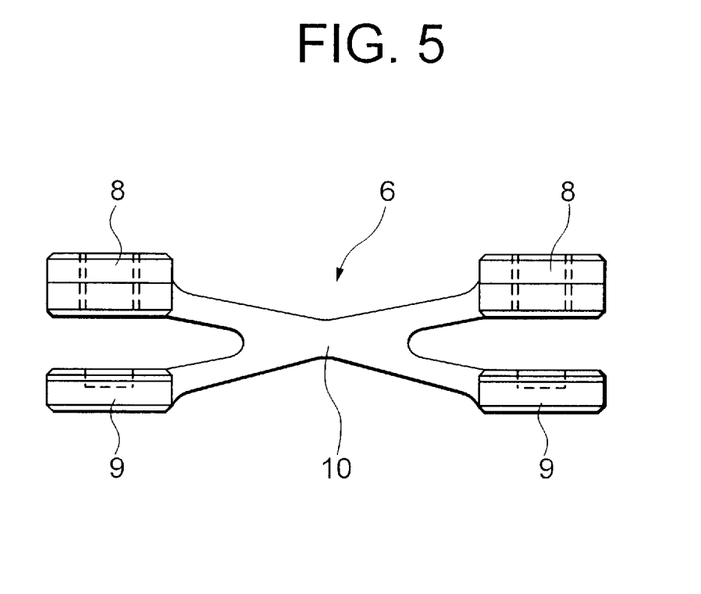
FIG. 5 is a side view showing a diameter-expanding member shown in FIG. 3.

According to the second embodiment, a couple of screw members 8 (first and third abutment members) and a couple of receiving members 9 (second and fourth abutment members) in the diameter-expanding member 6 are each spaced at a predetermined interval (d), and a connecting portion 10 (resilient connecting member, elastically deformable base) is so formed in an X-shape as to be elastically deformable in the radial direction. Each of the screw members 8 and the receiving members 9 is brought into contact with the seat portion 3 of the inner shaft in the same way as in the first embodiment.

In the second embodiment also, the thrusting force acting in the radial direction on the inner shaft 1 against the outer shaft 2 can be adjusted by controlling the fastening force of the adjustment screw 7 through each of the two through-holes 4, 5. The slide resistance between the two shafts 1 and 2 can be thereby easily adjusted, and the "backlash" between the two shafts 1 and 2 can be surely prevented. The operation efficiency can be more enhanced than in the prior arts.

Besides, the couple of screw members 8 and the couple of receiving members 9 are respectively spaced at the predetermined interval (d), and the connecting portion 10 is formed in the X-shape. Hence, even when a bending load acts on the two lengths of shafts 1, 2, the two shafts 1, 2 can be effectively prevented from being "twisted as by scooping", and the "backlash" between the two shafts 1 and 2 due to the "twist" can be surely prevented.

Third Embodiment

Figure 6:
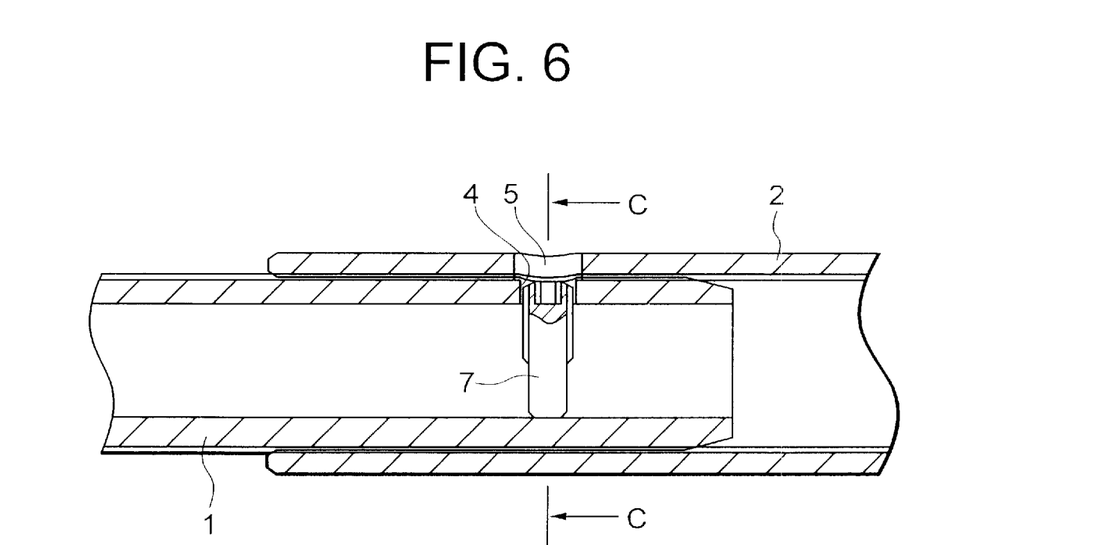
FIG. 6 is a vertical sectional view showing a steering shaft for a vehicle, to which a coupling structure of extensible shafts in a third embodiment of the present invention is applied.
Figure 7:
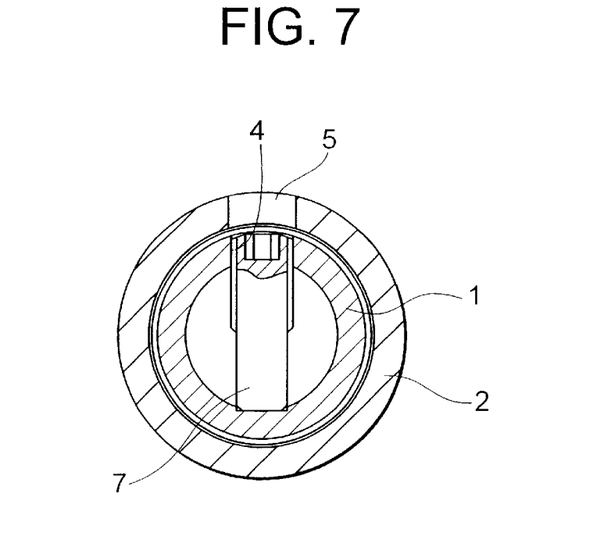
FIG. 7 is a cross-sectional view taken along the line C—C in FIG. 6.

FIG. 6 is a vertical sectional view showing a steering shaft for the vehicle, to which a coupling structure of an extensible shaft in a third embodiment of the present invention is applied. FIG. 7 is a cross-sectional view taken along the line C—C in FIG. 6.

The third embodiment takes such a configuration that the diameter-expanding member 6 is not provided, and the adjustment screw 7 is screwed directly to the female thread formed in the through-hole 4 of the inner shaft 1.

In the third embodiment also, the thrusting force acting in the radial direction on the inner shaft 1 against the outer shaft 2 can be adjusted by controlling the fastening force of the adjustment screw 7. The slide resistance between the two shafts 1 and 2 can easily be adjusted, and the "backlash" between the two shafts 1 and 2 can be surely prevented. As compared with the prior arts, the operation efficiency can be enhanced.

Note that a couple of adjustment screws 7 may be, as in the second embodiment, spaced at the predetermined interval (d), whereby the "twists" of the two shafts 1, 2 may effectively be prevented.

Fourth Embodiment

Figure 8:
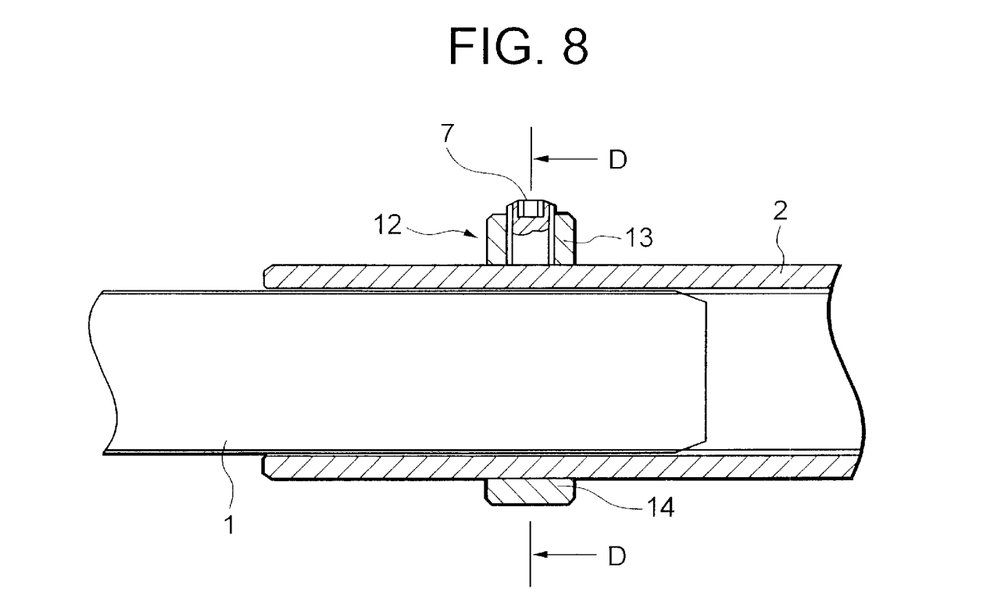
FIG. 8 is a vertical sectional view showing a steering shaft for a vehicle, to which a coupling structure of extensible shafts in a fourth embodiment of the present invention is applied.
Figure 9:
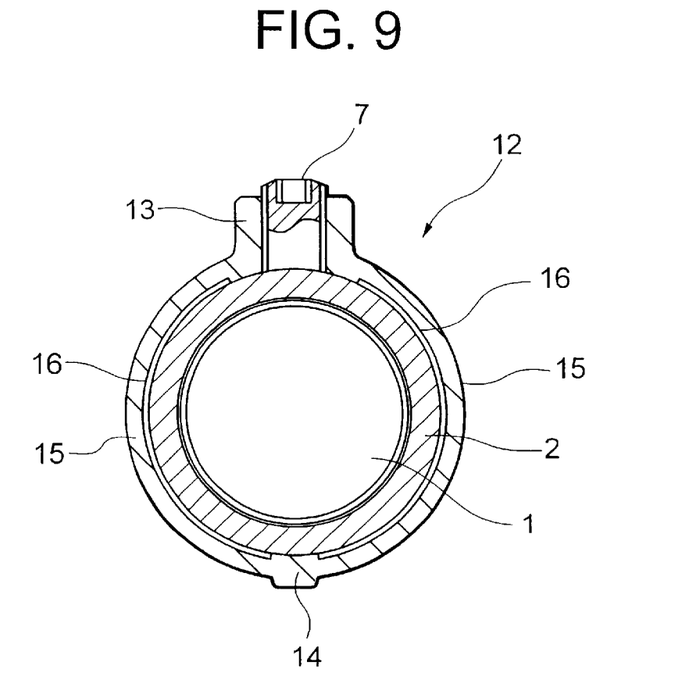
FIG. 9 is a cross-sectional view taken along the line D—D in FIG. 8.

FIG. 8 is a vertical sectional view showing a steering shaft for the vehicle, to which a coupling structure of an extensible shaft in a fourth embodiment of the present invention is applied. FIG. 9 is a cross-sectional view taken along the line D—D in FIG. 8.

A ring-shaped diameter-reducing member 12 for reducing a diameter of the outer shaft 2 is provided in the fourth embodiment. This diameter-reducing member 12 is provided with a screw member formed with a female thread meshing with the adjusting screw 7, and also with a receiving member 14 for supporting the outer shaft 2 in a way that faces in the radial direction to the screw member 13. The screw member 13 and the receiving member 14 are each brought into contact with an outer peripheral surface of the outer shaft 2 at their concaved cylindrical portions formed inwards. Further, the diameter-reducing member 12 is provided with a connecting portion 15 for connecting the screw member 13 to the receiving member 14 so as to be elastically deformable. A gap 16 is formed between an inner peripheral surface of this connecting portion 15 and an outer peripheral surface of the outer shaft 2.

With this configuration, the outer shaft 2 is spline-fitted to the inner shaft 1, and, after thus assembling these shafts, the adjustment screw 7 is fastened and thus moved inward in the radial direction. Then, a front side end of the adjustment screw 7 is brought into contact with the outer shaft 2, and the adjustment screw 7 is thus further fastened, with the result that the outer shaft 2, with its diameter being reduced in the radial direction (in the direction along an axial line of the adjustment screw 7), thrusts the inner shaft 1 inwards in the radial direction.

The thrusting force of the outer shaft 2 acting in the radial direction on the inner shaft 1 can be adjusted by controlling the fastening force of the adjustment screw 7. With this adjustment, the slide resistance between the two shafts 1 and 2 can easily be adjusted, and the "backlash" between the two shafts 1 and 2 can be surely prevented. Further, as described above, even after assembling the two shafts 1, 2, the slide resistance can easily be adjusted, and hence, as compared with the prior arts, the operation efficiency can be enhanced.

Note that a couple of diameter-reducing members 12 are, as in the second embodiment, spaced at the predetermined interval (d), and the "twist" may effectively be prevented. Further, the inner shaft 1 may be either solid or hollow.

Fifth Embodiment

Figure 10:
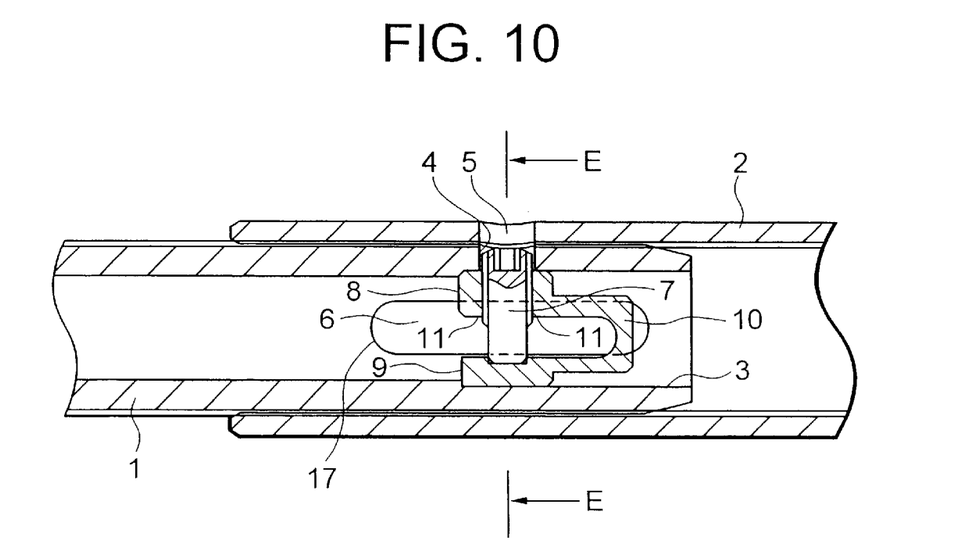
FIG. 10 is a vertical sectional view showing a steering shaft for a vehicle, to which a coupling structure of extensible shafts in a fifth embodiment of the present invention is applied.
Figure 11:
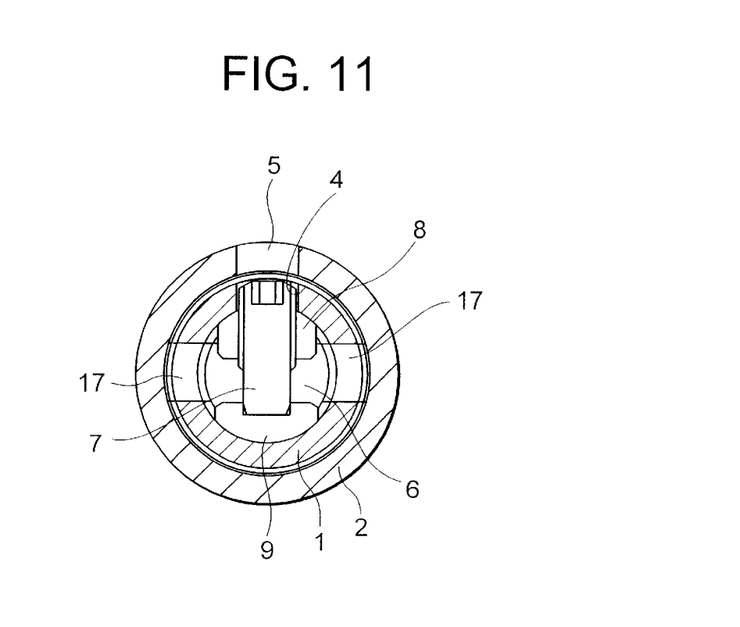
FIG. 11 is a cross-sectional view taken along the line E—E in FIG. 10.

FIG. 10 is a vertical sectional view showing a steering shaft for the vehicle, to which a coupling structure of an extensible shaft in a fifth embodiment of the present invention is applied. FIG. 11 is a cross-sectional view taken along the line E—E in FIG. 10.

The configurations of the through-holes 4, 5, the diameter-expanding member 6 and the adjustment screw 7 in the fifth embodiment, are the same as those in the first embodiment. In addition to the structure of the first embodiment, however, the inner shaft 1 is formed with a couple of elongate holes 17 formed side by side in the radial direction and extending in a direction orthogonal to a direction in which the adjustment screw 7 is intruded, i.e., in the axial direction of the inner shaft 1.

According to the fifth embodiment, when adjusting the fastening force of the adjustment screw 7, a rigidity of the inner shaft 1 is lessened due to a function of the elongate holes 17, whereby the inner shaft 1 gets easier to expand in the radial direction with the aid of the adjustment screw 7. It is therefore feasible to decrease the fastening force of the adjustment screw 7 and to enhance the operation efficiency.

Sixth Embodiment

Figure 12:
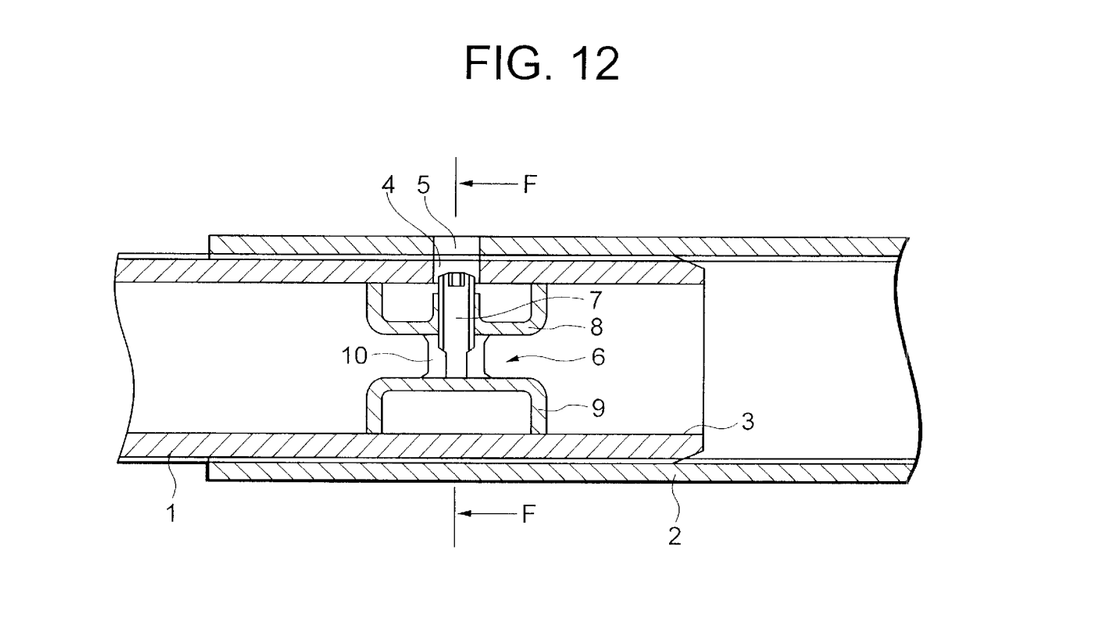
FIG. 12 is a vertical sectional view showing a steering shaft for a vehicle, to which a coupling structure of extensible shafts in a sixth embodiment of the present invention is applied.
Figure 13:
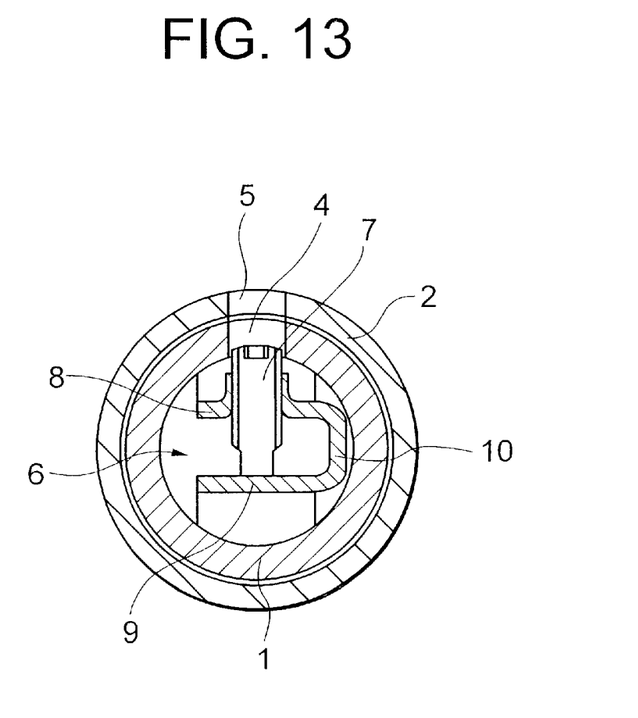
FIG. 13 is a cross-sectional view taken along the line F—F in FIG. 12.

FIG. 12 is a vertical sectional view showing a steering shaft for the vehicle, to which a coupling structure of an extensible shaft in a sixth embodiment of the present invention is applied. FIG. 13 is a cross-sectional view taken along the line F—F in FIG. 12.

The configurations of the seat member 3 and the through-hole 4 that are formed in the inner shaft 1 and the through-hole 5 formed in the outer shaft 2 in the sixth embodiment, are the same as those in the first embodiment. The diameter-expanding member 6 in the sixth embodiment, however, takes a structure different from the first embodiment.

In the sixth embodiment also, the diameter-expanding member 6 is constructed of the screw member 8 formed in the radial direction with a female screw hole into which the adjustment screw 7 is screwed, the receiving member 9 for supporting the front side end of the adjustment screw 7, and the connecting portion 10 for integrally connecting the screw member 8 to the receiving member so as to be elastically deformable in the radial direction.

In the sixth embodiment, each of the screw member 8 and the receiving member 9, as shown in FIG. 12, extends on both sides in the axial direction from its central portion formed with a screw hole or from its central portion coming into contact with the front side end of the adjustment screw 7, the extended side ends thereof are bent outwards in the radial direction to form a brace, and each of the members 8, 9 is brought into contact with the seat portion 3 of the inner shaft 1 at a protruded circular end surface of a front end of each brace. According to the sixth embodiment, the screw member 8 and the receiving member 9 are each given a spring property in such a configuration.

Because of being thus configured, the outer shaft 2 is spline-fitted to the inner shaft 1, and, after thus assembling these shafts, the adjustment screw 7 is fastened and thus moved inward in the radial direction through the through-holes 4, 5 aligned in the radial direction. Then, a radial interval between the receiving member 9 and the screw member 8 of the diameter-expanding member 6 is expanded, thereby thrusting the inner shaft 1 against the outer shaft 2 outwards in the radial direction.

Especially in the sixth embodiment, the screw member 8 and the receiving member 9 are each given the spring property and therefore deform simply by a slight increase in a fastening torque of the adjustment screw 7, resulting in a rise in quantity with which the adjustment screw 7 is intruded in the radial direction. It is therefore possible to take a wider allowance range of the fastening rotational angle of the adjustment screw 7. Hence, according to the sixth embodiment, the slide resistance between the two lengths of inner and outer shafts 1, 2 is easy for its adjustment and management as well.

Seventh Embodiment

Figure 14:
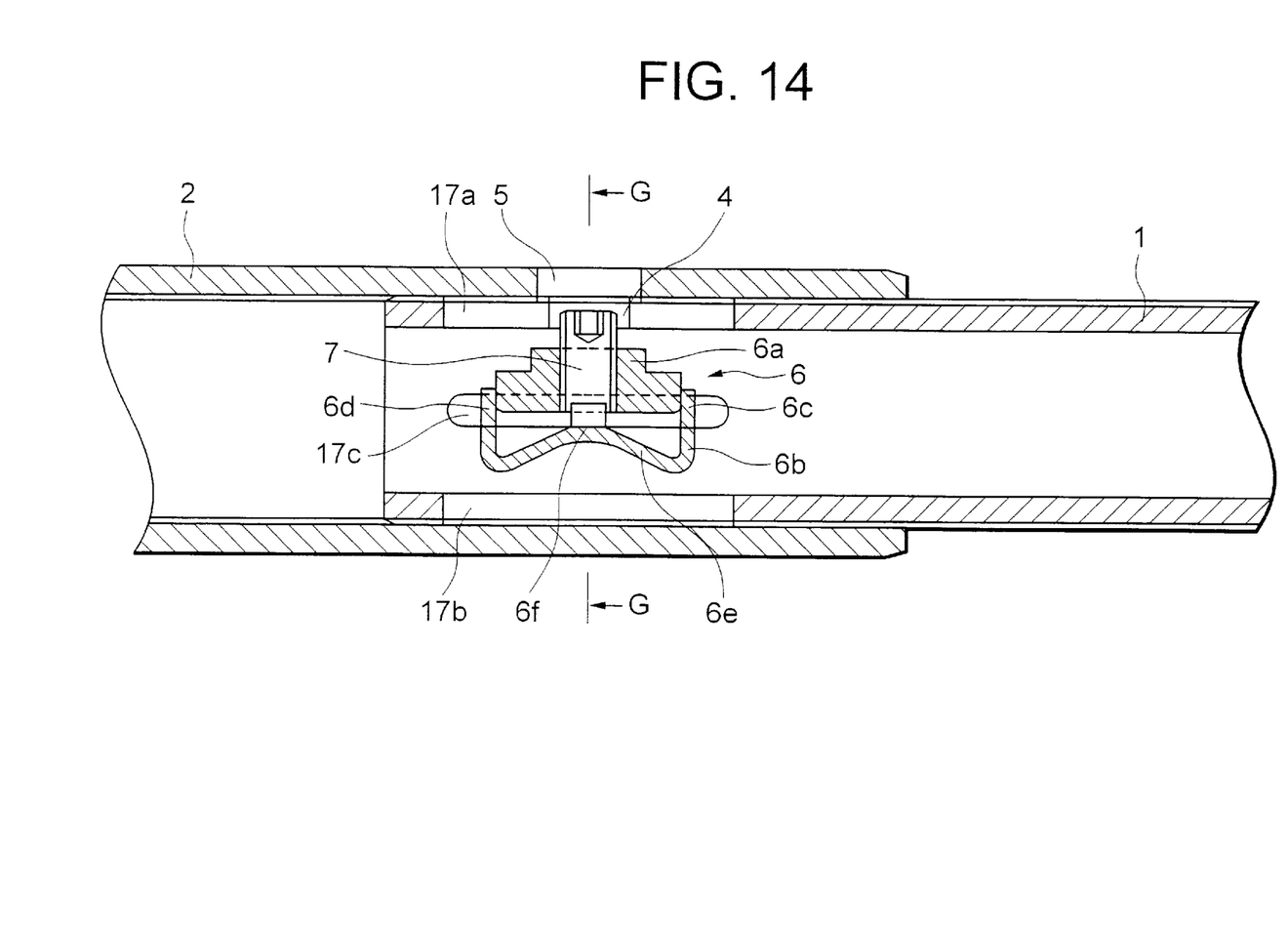
FIG. 14 is a vertical sectional view showing a steering shaft for a vehicle, to which a coupling structure of extensible shafts in a seventh embodiment of the present invention is applied.
Figure 15:
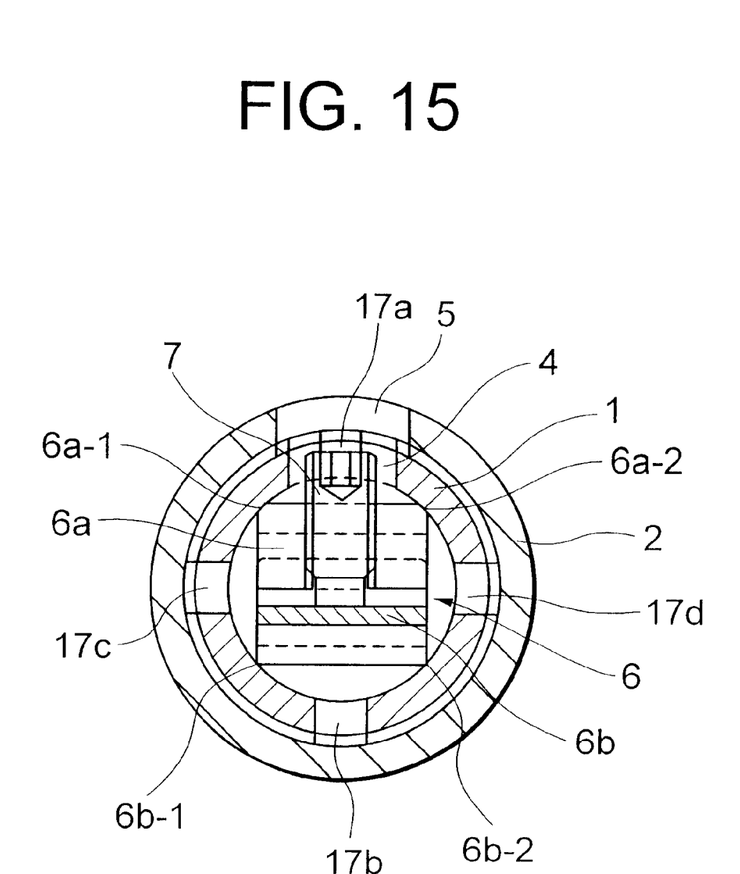
FIG. 15 is a cross-sectional view taken along the line G—G in FIG. 15.

FIG. 14 is a vertical sectional view showing a steering shaft for the vehicle, to which a coupling structure of an extensible shaft in a seventh embodiment of the present invention is applied. FIG. 15 is a cross-sectional view taken along the line G—G in FIG. 14.

In the seventh embodiment, the structures of the through-hole 4 formed in the inner shaft 1 and of the through-hole 5 formed in the outer shaft 2, are the same as those in the first embodiment. The configuration of the diameter-expanding member 6 is, however, different from that in the first embodiment. In addition to the structure in the first embodiment, the inner shaft 1 is formed with two pieces of elongate holes 17a, 17b extending in the axial direction in two upper and lower positions intersecting the intruding direction of the adjustment screw 7, and two pieces of elongate holes 17c, 17d extending in the axial direction and disposed side by side in the radial direction at the middle between the elongate holes 17a and 17b.

According to the seventh embodiment, the diameter-expanding member 6 is constructed of a screw member 6a having a female screw hole formed in the radial direction, into which the adjustment screw 7 is screwed, and a receiving member 6b given a spring property enough to receive a contact of the front side end of the adjustment screw 7. The screw member 6a takes a quadrangle column-like shape extending in the axial direction, and includes two upper side edges 6a-1, 6a-2 extending in the axial direction and brought into contact with the inner peripheral surface of the inner shaft 1, thus thrusting the inner shaft 1. On the other hand, the receiving member 6b is constructed of two side walls 6c, 6d facing to each other in the axial direction and extending in the direction substantially right-angled to the axial direction, and a bottom wall 6e having a swelling 6f at its central portion in the axial direction, and takes a substantially inverted M-shape in section in the longitudinal direction of the inner shaft 1 on the whole. The receiving member 6b is structured to thrust the inner shaft 1 with thrust points 6b-1, 6b-2 coming into contact with the inner peripheral surface of the inner shaft at a couple of both side ends extending in the axial direction of the bottom wall 6e. The female screw hole of the screw member 6a is formed substantially at the center of the screw member 6a, and a lower side end of the adjustment screw 7 impinges upon the swelling 6f of the bottom wall 6e of the receiving member 6b.

Both of the side surfaces of the screw member 6a in the axial direction are brought into contact with inner surfaces of the two side walls 6c, 6d of the receiving member 6b. The receiving member 6b is given a spring property enough to generate a resilient force when the swelling 6f of the bottom wall 6e is thrust downward by the adjustment screw 7.

Note that the diameter-expanding member 6 may take such a structure that the individually formed screw member 6a and receiving member 6b are, when incorporated into the inner shaft 1, are assembled, or that the screw member 6a and the receiving member 6b are integrally assembled by press-fitting or caulking etc.

With this configuration, the outer shaft 2 is spline-fitted to the inner shaft 1, and, after thus assembling these shafts, the adjustment screw 7 is fastened and thus moved inward in the radial direction through the through-holes 4, 5 aligned in the radial direction. Then, a radial interval is expanded while both of the side surfaces of the screw member 6a of the diameter-expanding member 6 in the axial direction are held by the inner surfaces of the two side walls of the receiving member 6b. Then, as shown in FIG. 15, the thrust points 6a-1, 6a-2, 6b-1, 6b-2 of the diameter-expanding member 6 upon the inner shaft 1, thrust the inner shaft 1 outward in the radial direction against the outer shaft 2.

Especially in the seventh embodiment, the receiving member 6b is given the spring property and therefore deforms simply by a slight increase in the fastening torque of the adjustment screw 7. This makes it feasible to take a wider allowance range of the fastening rotational angle of the adjustment screw 7 because of a rise in the radially intruded quantity of the adjustment screw 7.

Further, according to the seventh embodiment, when adjusting the fastening force of the adjustment screw 7, a rigidity of the inner shaft 1 is lessened due to a function of the elongate holes 17a, 17b, 17c, 17d, whereby the inner shaft 1 gets easier to expand in the radial direction by the thrust points 6a-1, 6a-2, 6b-1, 6b-2. It is therefore feasible to decrease the fastening force of the adjustment screw 7 and to enhance the operation efficiency. Note that the same effect as the above-mentioned is obtained by providing, as in the fifth embodiment, at least a couple of elongate holes 17 in the inner shaft 1.

Hence, according to the seventh embodiment, the slide resistance between the two lengths of inner and outer shafts 1, 2 is easy for its adjustment and management as well.

Note that the spline- or serration-fitting portions of the inner and outer shafts 1, 2 are subjected to a surface hardening treatment (thermal treatment, hard coating etc) or a coating process using molybdenum dioxide, a resin etc, whereby an expansion durability can be enhanced in all of the embodiments discussed above.

It is to be noted that the present invention is not limited to the embodiments discussed above and may be modified in a variety of forms.

INDUSTRIAL APPLICABILITY

As discussed above, according to the present invention, because of providing the adjustment screw that moves in the radial directions of the two shafts, even after fitting and thus assembling the outer shaft to the inner shaft, the thrusting force in the radial direction between the two shafts can be easily adjusted by moving the adjustment screw in the radial direction. With this adjustment, the slide resistance between the two shafts can be easily adjusted, and the "backlash" between the two shafts can be surely prevented.

Moreover, even after assembling the two shafts, the slide resistance can be easily adjusted, and hence, as compared with the prior arts, the operation efficiency can be enhanced.

What is claimed is:

1. A coupling structure of a steering apparatus comprising:

a hollow cylindrical inner shaft;

a hollow cylindrical outer shaft fitted on said inner shaft and partially overlapped therewith in an axial direction, the outer shaft and the inner shaft being telescopically movable relatively to each other and being interengaged through a projecting portion formed on a periphery of one of the outer shaft and the inner shaft to transmit rotation therebetween;

an adjustment mechanism for adjusting a state of contact between said inner shaft and said outer shaft;

wherein the adjustment mechanism includes an adjustment member disposed in a hollow space of the inner shaft to expand the inner shaft radially outwardly, said adjustment member having a first end and a second end, said second end of said adjustment member contacting an abutment surface within said hollow inner shaft, and a positioning mechanism constructed to change a radial position of the adjustment member relative to the inner shaft to adjust a force of said second end of said adjustment member on said abutment surface and change said state of contact between the inner shaft and the outer shaft and thereby change a sliding resistance therebetween;

the inner shaft and the outer shaft being formed with radially opposed through-holes so that said radial position of said adjustment member may be adjustable through said through-holes from outside the outer shaft.

2. A coupling structure according to claim 1, wherein said positioning mechanism includes a female thread formed in a periphery of said through-hole of the inner shaft and a male thread formed on said first end of said adjustment member and engaged with said female thread; and said second end of said adjustment member abuts the inner periphery of the inner shaft.

3. A coupling structure according to claim 1, wherein said adjustment mechanism further includes a first abutment member which is in contact with a portion of the inner periphery of the inner shaft, a second abutment member which is in contact with another portion of the inner periphery of the inner shaft to expand the inner shaft radially outwardly so as to adjust the sliding resistance between the inner shaft and the outer shaft;

said positioning mechanism including a female thread formed through said first abutment member facing said through-hole of said inner shaft, and a male thread formed on said first end of said adjustment member and engaged with said female thread of the first abutment member;

said adjustment member abutting at said second end thereof said second abutment member; and wherein a distance between said first abutment member and said second abutment member is changeable by adjusting said adjustment member through said through-holes of the outer and inner shafts from outside the outer shaft.

4. A coupling structure according to claim 3, wherein said adjustment mechanism further includes a resilient connecting member which integrally connects said first abutment member and said second abutment member.

5. A coupling structure of a steering apparatus comprising:

a hollow cylindrical inner shaft;

a hollow cylindrical outer shaft fitted on said inner shaft and partially overlapped therewith in an axial direction, the outer shaft and the inner shaft being telescopically movable relatively to each other and being interengaged through a projecting portion formed on a periphery of one of the outer shaft and the inner shaft to transmit rotation therebetween; and an adjustment mechanism for adjusting a state of contact between said inner shaft and said outer shaft;

wherein said adjustment mechanism includes an annular member fitted on the outer shaft, the annular member being formed with a radially inward projection having an end that inwardly presses an outer periphery of the outer shaft, and an adjustment screw which is in threaded engagement with the annular member to be movable in a radial direction of said outer shaft relatively to the outer shaft, and an inner end of said adjustment screw inwardly pressing the outer periphery of said outer shaft, the radial position of said adjustable screw being changeable by adjusting said adjustment screw with respect to said annular member, thereby changing an inward pressing force acting on the outer shaft so that a state of the sliding contact between the inner shaft and the outer shaft is changed.

6. A coupling structure of a steering apparatus comprising:

a hollow cylindrical inner shaft;

a hollow cylindrical outer shaft axially overlapping said inner shaft and coupled thereto through a projecting portion formed on a periphery of one of the outer shaft and the inner shaft to transmit rotational motion therebetween, said outer shaft and said inner shaft being in frictional contact and axially movable relative to one another; and a friction adjustment mechanism disposed within said inner shaft and constructed to exert a radially outwardly directed force component on an inner wall of said inner shaft sufficient to adjust said frictional contact;

said friction adjustment mechanism including a screw having a first end and a second end, said second end of said screw contacting an abutment surface within said hollow inner shaft, and said outer shaft having a through-hole providing access to said first end of said screw.

7. The coupling structure of claims 6, wherein said screw is radially oriented.

8. The coupling structure of claim 7, wherein said radially oriented screw is threadably mounted in a radial through-hole in said wall of said inner shaft.

9. A telescoping steering shaft comprising:

a hollow cylindrical inner shaft;

a hollow cylindrical outer shaft, axially overlapping said inner shaft and coupled thereto through a projecting portion formed on a periphery of one of the outer shaft and the inner shaft to transmit torque between said inner shaft and said outer shaft, said outer shaft and said inner shaft being in frictional contact and axially movable relative to one another; and a friction adjustment mechanism constructed to exert a radially directed force component on one of an inner wall of said inner shaft or an outer wall of said outer shaft sufficient to adjust said frictional contact;

said friction adjustment mechanism including a screw having a first end and a second end, and said radially directed force component being a thrusting force exerted by said second end of said screw on an abutment surface.

10. The telescoping steering shaft of claim 9, wherein said screw is radially oriented.

11. The telescoping steering shaft of claim 10, wherein said friction adjustment mechanism is disposed within said inner shaft and exerts a radially outward force on said inner wall of said inner shaft;

said radially oriented screw adjusts said outward force; and said outer shaft is provided with a radial through-hole providing access to said radially oriented screw.

12. The telescoping steering shaft of claim 11, wherein said radially oriented screw is threadably mounted in a radial through-hole in said inner shaft.

13. The telescoping steering shaft of claim 11, wherein said through-hole of said outer shaft is a first outer shaft through-hole and said inner shaft is provided with a first inner shaft through-hole aligned with said first outer shaft through hole;

said adjustment mechanism further includes an elastically deformable base, a first abutment member extending from said base and contacting a first portion of said inner wall, a second abutment member extending from said base and contacting a second portion of said inner wall generally radially opposite to said first portion;

said radially oriented screw is a first radially oriented screw and is threadably mounted in said first abutment member at a position accessible through said first inner shaft through-hole; and said radially oriented screw bears against said second abutment member.

14. The telescoping steering shaft of claim 13, wherein said outer shaft is provided with a second outer shaft through-hole and said inner shaft is provided with a second inner shaft through-hole aligned with said second outer shaft through hole;

said adjustment mechanism further includes a third abutment member extending from said elastically deformable base and contacting a third portion of said inner wall, and a fourth abutment member extending from said base and contacting a fourth portion of said inner wall generally radially opposite to said third portion;

a second radially oriented screw is threadably mounted in said third abutment member at a position accessible through said second inner shaft through-hole; and said second radially oriented screw bears against said fourth abutment member.

15. The telescoping steering shaft of claim 11, wherein said outer shaft is provided with at least one axially-extending slot adjacent to said friction adjustment mechanism.

16. The telescoping steering shaft of claim 9, wherein said friction adjustment mechanism comprises a ring-shaped diameter-reducing member surrounding said outer shaft; and said screw exerts a radially inward force on said outer wall of said outer shaft.

17. A coupling structure of a steering apparatus comprising:

a hollow cylindrical inner shaft;

a hollow cylindrical outer shaft axially overlapping said inner shaft and coupled thereto to transmit rotational motion therebetween, said outer shaft and said inner shaft being in frictional contact and axially movable relative to one another; and a friction adjustment mechanism disposed within said inner shaft and constructed to exert a radially outwardly directed force component on an inner wall of said inner shaft sufficient to adjust said frictional contact;

said friction adjustment mechanism including a screw having a first end and a second end, said second end of said screw contacting an abutment surface within said hollow inner shaft, and said outer shaft having a through-hole providing access to said first end of said screw.

18. The coupling structure of claim 17, wherein said screw is radially oriented.

19. The coupling structure of claim 18, wherein said radially oriented screw is threadably mounted in a radial through-hole in said wall of said inner shaft.

20. A telescoping steering shaft comprising:

a hollow cylindrical inner shaft;

a hollow cylindrical outer shaft, axially overlapping said inner shaft and coupled thereto to transmit torque between said inner shaft and said outer shaft, said outer shaft and said inner shaft being in frictional contact and axially movable relative to one another; and a friction adjustment mechanism constructed to exert a radially directed force component on one of an inner wall of said inner shaft or an outer wall of said outer shaft sufficient to adjust said frictional contact;

said friction adjustment mechanism including a screw having a first end and a second end, and said radially directed force component being a thrusting force exerted on an abutment surface by said second end of said screw.

21. The telescoping steering shaft of claim 20, wherein said screw is radially oriented.

22. The telescoping steering shaft of claim 21, wherein said friction adjustment mechanism is disposed within said inner shaft and exerts a radially outward force on said inner wall of said inner shaft;

said radially oriented screw adjusts said outward force; and said outer shaft is provided with a radial through-hole providing access to said radially oriented screw.

23. The telescoping steering shaft of claim 22, wherein said radially oriented screw is threadably mounted in a radial through-hole in said inner shaft.

24. The telescoping steering shaft of claim 22, wherein said through-hole of said outer shaft is a first outer shaft through-hole and said inner shaft is provided with a first inner shaft through-hole aligned with said first outer shaft through hole;

said adjustment mechanism further includes an elastically deformable base, a first abutment member extending from said base and contacting a first portion of said inner wall, a second abutment member extending from said base and contacting a second portion of said inner wall generally radially opposite to said first portion;

said radially oriented screw is a first radially oriented screw and is threadably mounted in said first abutment member at a position accessible through said first inner shaft through-hole; and said radially oriented screw bears against said second abutment member.

25. The telescoping steering shaft of claim 24, wherein said outer shaft is provided with a second outer shaft through-hole and said inner shaft is provided with a second inner shaft through-hole aligned with said second outer shaft through hole;

said adjustment mechanism further includes a third abutment member extending from said elastically deformable base and contacting a third portion of said inner wall, and a fourth abutment member extending from said base and contacting a fourth portion of said inner wall generally radially opposite to said third portion; and a second radially oriented screw is threadably mounted in said third abutment member at a position accessible through said second inner shaft through-hole; and said second radially oriented screw bears against said fourth abutment member.

26. The telescoping steering shaft of claim 22, wherein said outer shaft is provided with at least one axially-extending slot adjacent to said friction adjustment mechanism.

27. The telescoping steering shaft of claim 20, wherein said friction adjustment mechanism comprises a ring-shaped diameter-reducing member surrounding said outer shaft; and said screw exerts a radially inward force on said outer wall of said outer shaft.

* * * * *